United States Patent
Swanberg et al.

(10) Patent No.: US 7,458,076 B2
(45) Date of Patent: Nov. 25, 2008

(54) METHOD, APPARATUS, AND COMPUTER PROGRAM PRODUCT FOR DYNAMICALLY TUNING A DATA PROCESSING SYSTEM BY IDENTIFYING AND BOOSTING HOLDERS OF CONTENTIOUS LOCKS

(75) Inventors: Randal Craig Swanberg, Round Rock, TX (US); Suresh Eswara Warrier, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 804 days.

(21) Appl. No.: 10/912,500

(22) Filed: Aug. 5, 2004

(65) Prior Publication Data
US 2006/0031658 A1    Feb. 9, 2006

(51) Int. Cl.
*G06F 9/46* (2006.01)
(52) U.S. Cl. ...................................... 718/100
(58) Field of Classification Search .................. 718/100
See application file for complete search history.

(56) References Cited

U.S. PATENT DOCUMENTS 6,842,809 B2 *   1/2005   Browning et al. ........... 710/200
7,278,141 B2 * 10/2007   Accapadi et al. ............ 718/103

* cited by examiner

*Primary Examiner*—Meng-Ai An
*Assistant Examiner*—Mengyao Zhe
(74) *Attorney, Agent, or Firm*—Duke W. Yee; Diana R. Gerhardt; Gerald H. Glanzman (57) ABSTRACT

A method, apparatus, and computer program product are disclosed for a simultaneous multithreading (SMT) data processing system for modifying the processing of software threads that acquire a contentious software lock. The system includes a processor that is capable of concurrently executing multiple different threads on the processor. The processor is also capable of utilizing hardware thread priorities assigned to each thread the processor is processing by granting a greater, disparate amount of resources to the highest priority thread. A hardware priority is assigned to each one of the SMT threads. A contentious lock is identified. Ones of the multiple threads are identified that attempt to acquire the contentious lock. These threads are dynamically redirected to special code for handling contentious locks. The hardware priority of a thread acquiring a contentious lock is then boosted. According to the preferred embodiment, the present invention redirects callers of a locking function to a "hot" locking function when the lock they are acquiring has been classified as "hot", and vice versa.

12 Claims, 5 Drawing Sheets

METHOD, APPARATUS, AND COMPUTER PROGRAM PRODUCT FOR DYNAMICALLY TUNING A DATA PROCESSING SYSTEM BY IDENTIFYING AND BOOSTING HOLDERS OF CONTENTIOUS LOCKS

BACKGROUND OF THE INVENTION

1. Technical Field

The present invention is directed to data processing systems. More specifically, the present invention is directed to a method, apparatus, and computer program product for identifying contentious software locks and boosting the hardware controlled priority of threads in a Simultaneous Multi Threading (SMT) environment that acquire these contentious locks.

2. Description of Related Art

A symmetric multiprocessing (SMP) data processing system has multiple processors that are symmetric such that each processor has the same processing speed and latency. An SMP system has one operating system that divides the work into tasks that are distributed evenly among the various processors by dispatching one software thread of work to each processor at a time. Thus, a processor in an SMP system executes only one thread at a time.

A simultaneous multi-threading (SMT) data processing system includes multiple processors that can each concurrently execute more than one thread at a time per processor. An SMT system has the ability to favor one thread over another when both threads are running on the same processor. Each thread is assigned a hardware-level priority. Each processor in the SMT system can determine the priority of each thread that it is concurrently executing. The thread that has the highest priority will be granted more decode units, more dispatch cycles, and by making other resources more available to that thread. Therefore, the higher priority thread will use more of the processor's resources and as a result do more work than the lower priority sibling threads on the same processor. Hardware-level priorities are different from the operating system or software-assigned priorities which the scheduler uses to determine which thread to dispatch next on the processor.

In known SMT systems, the only use for hardware thread priority has been the voluntarily lowering of thread priority when the importance of the work was known to be less than work being done by the other threads. For example, if one thread being executed by a processor was idle, that thread might voluntarily lower its priority to permit the other threads being executed by the same processor more access to the processor's resources.

Software locks are known in the art. Locks are typically used to serialize access to some shared resource. Thus, prior to a thread accessing a shared resource, it is required that the thread acquire a particular software lock. After a thread acquires the lock, that thread holds the lock as long as it requires access to the shared resource. Other threads desiring to access the same resource must wait until the thread finishes its work and releases the lock. When the lock is released, it is available, and waiting or spinning threads may again contend for the lock.

There are some locks that are so critical to overall system performance that the benefit of reducing lock hold time, i.e. the time spent by a caller waiting to acquire the lock, outweighs any temporary disparities between the priority of the lock holding thread and the priority of the sibling threads on the same processor that are performing other work. For these locks, overall system performance would be improved if the lock hold time is reduced for all threads attempting to acquire that lock regardless of the potentially unrelated sibling threads' priority. Therefore, a need exists for a method, apparatus, and computer program product for identifying contentious software locks that are critical to overall system performance and modifying the processing of the SMT threads that acquire these contentious locks by boosting the hardware priority of these threads.

SUMMARY OF THE INVENTION

A method, apparatus, and computer program product are disclosed for a simultaneous multithreading (SMT) data processing system for modifying the processing of software threads that acquire a contentious software lock. The system includes a processor that is capable of concurrently executing multiple different threads on the processor. The processor is also capable of utilizing hardware thread priorities assigned to each thread the processor is processing by granting a greater, disparate amount of resources to the highest priority thread. A hardware priority is assigned to each one of the SMT threads. A contentious lock is identified. Ones of the multiple threads are identified that attempt to acquire the contentious lock. These threads are dynamically redirected to special code for handling contentious locks. The hardware priority of a thread acquiring a contentious lock is then boosted. According to the preferred embodiment, the present invention redirects callers of a locking function to a "hot" locking function when the lock they are acquiring has been classified as "hot", and vice versa.

In this manner, the locking function(s) themselves are streamlined with a small instruction cache footprint (e.g. one without a bunch of compares and branches) for performance reasons. It should be noted that the present invention could have been implemented with a single locking function, without the redirection, with just conditional checks within the single lock function on whether to boost the thread priority or not.

The above as well as additional objectives, features, and advantages of the present invention will become apparent in the following detailed written description.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

A preferred embodiment of the present invention and its advantages are better understood by referring to the figures, like numerals being used for like and corresponding parts of the accompanying figures.

The present invention is a method, apparatus, and computer program product for identifying contentious locks that are so critical to overall system performance that system throughput is adversely affected by a significant number of software threads being unable to make forward progress without acquiring the lock. The processing of the software threads that attempt to acquire this contentious software lock is modified.

An SMT system includes a processor that is capable of concurrently executing multiple different threads on the processor. Each thread is assigned an SMT hardware thread priority. When the processor is executing multiple threads, the processor determines what priority is currently assigned to each thread and then favors the thread with the higher priority by granting to that thread more system resources.

A hardware priority is assigned to each one of the threads by storing a thread's priority in a register that is associated with the thread. When a thread acquires a lock that has been designated as being contentious, the thread's priority is boosted to a higher priority by storing a higher priority for that thread in the thread's register. Thus, the work performed by each thread that acquires a contentious lock will be performed at a more favored priority than sibling threads on the same processor. Because the thread will execute at a higher priority, the thread will be able to complete its work faster and thus release the lock faster. In this manner, the lock will become less contentious because the lock will be available more frequently resulting in threads not having to spin as long waiting for the lock to become available. By boosting the priority of the lock holding thread for these locks, the lock is held by one thread for a shorter time, thus making the lock more readily available to other threads.

Threads that need to acquire a lock spin in a program loop until they have acquired the lock. The loop involves code that performs an atomic operation to take the lock. If the lock is available, the thread acquires it and breaks out of the loop. If the lock is currently owned by another thread, the atomic operation is unsuccessful and the thread returns to the top of the loop and continues the process. A contentious lock is identified by tracking the number of times a thread makes an unsuccessful attempt to acquire the lock. If this number of times exceeds a threshold, referred to herein as a contention threshold, the lock is designated, or identified, as being a contentious lock. The locking function that grants ownership of locks tracks this number of times threads make unsuccessful attempts to acquire a lock. The unlocking function restores the thread's hardware priority to its normal priority when the lock is no longer contentious.

Once the lock is not as contentious, the priority of the threads that acquire the lock will no longer be boosted when the lock is acquired. A first-try acquire statistic is tracked and is used to determine how many times threads were granted the lock on their first attempt to acquire the lock. A non-contention threshold is specified. The first-try acquire statistic is compared to the non-contention threshold. If the first-try acquire statistic exceeds the threshold, the lock is no longer determined to be contentious and will no longer be designated as a contentious lock. When this occurs, the priority of the threads acquiring this lock will no longer be promoted to a higher hardware thread priority.

A modified locking function and a hot locking function are described herein for identifying and designating locks as being contentious, for removing the contentious designation from locks, and for maintaining the lock miss statistic and first-try acquire statistic. The locking function code itself is used by the operating system kernel to keep track of how contentious it is to acquire a particular lock.

When a thread first attempts to acquire a lock, the thread calls a modified locking function by executing a branch command that includes the address of the modified locking function. Threads will use the modified locking function to acquire locks under normal operating conditions. This modified locking function tracks the number of times the various threads attempted unsuccessfully to acquire a lock. The modified locking function determines whether this number of times, referred to herein as the lock miss statistic, exceeds the contention threshold. If the number of misses does exceed the threshold, the lock is designated as being a hot lock, i.e. a contentious lock.

When a thread acquires a hot lock, the address of the locking function is changed within the thread itself. This address is changed from the address of the modified locking function to an address of the hot lock locking function. Therefore, the next time this thread attempts to acquire this lock, the thread will be routed to the hot lock locking function instead of the modified locking function.

In an alternate embodiment, this process could be accomplished by having a single locking function instead of two different locking functions. The single locking function would include conditional checks as to whether the lock is designated as hot, and subsequently conditionally boost the hardware thread priority when the lock is acquired. The preferred embodiment, however, is to redirect the calling threads to separate locking functions in order to streamline the locking function execution paths and reduce instruction cache footprint.

Locking functions have to be optimized because they are used a lot in performance-critical sections. Adding even a few lines of extra code to check if the lock is designated as being "hot" can cause adverse impact to the system performance. In the current embodiment, locks that are not designated as being "hot" or contentious are acquired using the modified locking function with no performance impacts. The code that counts the unsuccessful attempts to acquire a lock, code that designates a lock as "hot" and code that modifies the branching address, are all done by a thread while it waits for the lock to be freed and does not add to the execution path length.

The hot lock locking function tracks the number of times the calling thread was able to acquire a lock on its first attempt. This number of times is referred to herein as the first-try acquire statistic. When the first-try acquire statistic exceeds a non-contention threshold, the priority of the threads that acquire this lock are no longer boosted to a higher hardware thread priority. The address in the branch command that is executed when the thread attempts to acquire the lock is replaced with the address of the modified locking function instead of the address of the hot lock locking function. Therefore, the next time this thread needs to acquire this lock, the lock will again be directed to the modified locking function instead of the hot lock locking function.

The contention and non-contention thresholds can be modified dynamically during runtime. The determination of which locks within the system are contentious, and what constitutes contention are workload dependent. For this reason, the invention dynamically determines at run time which locks are contentious, and can also dynamically adjust the contention and non-contention thresholds to adapt to the current workload. This is accomplished by first having a set of default contention thresholds. For example, when the system is first initialized, the contention thresholds might be set to classify a lock as contentious, or hot, if it is encountering 1000 misses over a duration of 10 milliseconds. Similarly, the non-contention thresholds might be set to demote a hot lock if it is encountering 100 successful first attempt acquires over a duration of 10 milliseconds.

A cap on the number of locks that can be classified as "hot" is also maintained. Typically, this cap is determined as a function of the number of processors, and resulting SMT threads, in the system. For example, on a 4-way processor system the cap might default to allowing four hot locks. In the best case, this would allow four SMT threads each operating on separate processors to each own one of the four hot locks operating at a boosted hardware thread priority. When a fifth lock, in this example, were to meet existing contention thresholds, the thresholds can be incrementally modified, e.g. contention thresholds modified to 2000 misses over a duration of five milliseconds and non-contention thresholds modified to 50 first attempt acquires over a duration of five milliseconds, in an attempt to correctly identify only the top four contentious locks. Similarly, when the number of hot locks in the system falls below the cap, the thresholds can be incrementally modified in the other direction for the same purpose.

The following is an example of a calling application's code that depicts the replacement in the branch command of the address of the modified locking function with the address of the hot lock function:

Before Replacement:

```
ld    r3, 8(r4)           # load address of lock word
bl    lock_function       # branch to the locking function to
                            acquire this lock
.
.                         # perform work while holding the lock
.
bl    unlock_function     # release the lock
```

After Replacement:

```
.
ld    r3, 8(r4)               # load address of lock word
bl    lock_function_hot       # branch to "hot" lock version
                                which will boost priority
.
.                             # perform work while holding the
                                lock with boosted priority
.
bl    unlock_function         # release the lock and restore
                                priority
```

In the present invention, a single unlock function is shown which unconditionally restores hardware thread priority to its normal value, regardless of whether the lock being unlocked is classified as hot or not. This works for SMT hardware where the act of changing thread priority is inexpensive, such as on the POWER5 architecture processors which utilize specific No-Op instruction forms for modifying hardware thread priority. In the case that the act of lowering priority is expensive, the same approach of redirecting the callers can be applied by also providing a modified unlocking function and a hot lock unlocking function.

Figure 1:
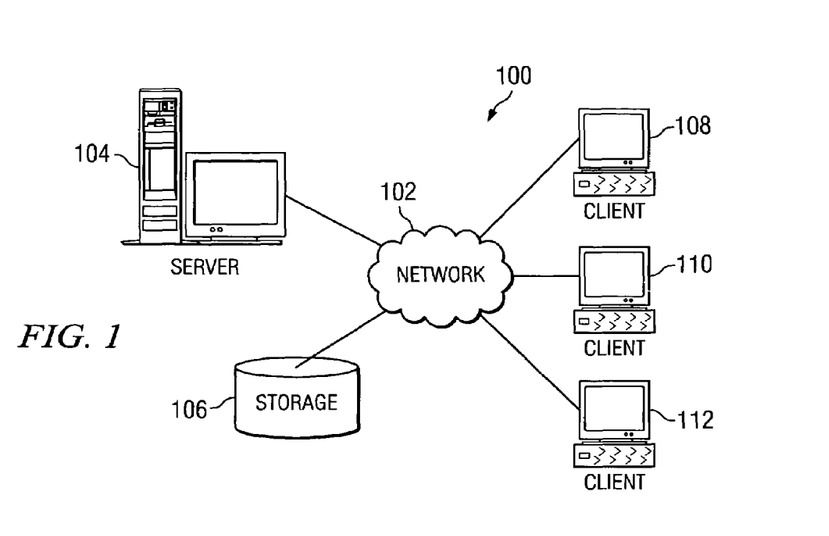
FIG. 1 is a pictorial representation which depicts a network of data processing systems in accordance with the present invention.

FIG. 1 depicts a pictorial representation of a network of data processing systems in which the present invention may be implemented. Network data processing system 100 is a network of computers in which the present invention may be implemented. Network data processing system 100 contains a network 102, which is the medium used to provide communications links between various devices and computers connected together within network data processing system 100. Network 102 may include connections, such as wire, wireless communication links, or fiber optic cables.

In the depicted example, a server 104 is connected to network 102 along with storage unit 106. In addition, clients 108, 110, and 112 also are connected to network 102. These clients 108, 110, and 112 may be, for example, personal computers, network computers, or other computing devices. In the depicted example, server 104 provides data, such as boot files, operating system images, and applications to clients 108-112. Clients 108, 110, and 112 are clients to server 104. Network data processing system 100 may include additional servers, clients, and other devices not shown. In the depicted example, network data processing system 100 is the Internet with network 102 representing a worldwide collection of networks and gateways that use the TCP/IP suite of protocols to communicate with one another. At the heart of the Internet is a backbone of high-speed data communication lines between major nodes or host computers, consisting of thousands of commercial, government, educational and other computer systems that route data and messages.

Of course, network data processing system 100 also may be implemented as a number of different types of networks, such as for example, an intranet, a local area network (LAN), a wide area network (WAN), or a wireless network. FIG. 1 is intended as an example, and not as an architectural limitation for the present invention.

As described in more detail below, one of these computer systems, such as client 108 may be linked to another computer system, such as client 110. Thus, client 108 will include a network adapter or port that is linked to a network adapter that is included in client 110. These two clients 108, 110 are thus linked via network 102. Preferably, network 102 is an Ethernet network and the clients are linked via an Ethernet standard link.

Figure 2:
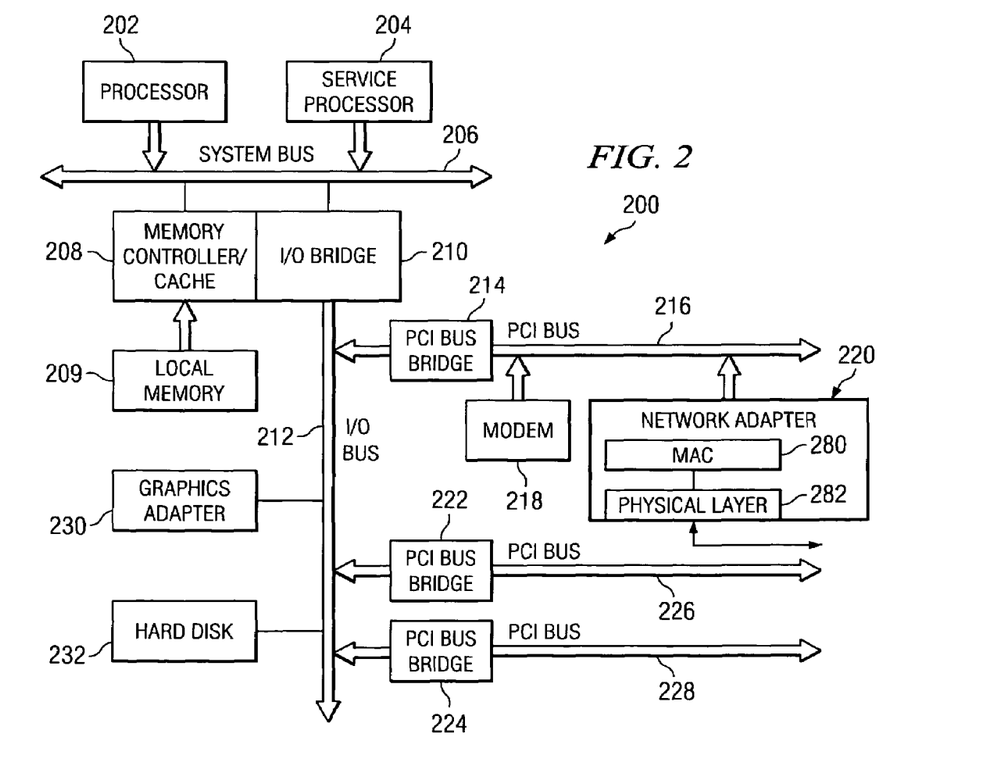
FIG. 2 is a more detailed illustration of a computer system that may be used to implement any of the computer systems of FIG. 1 in accordance with the present invention.

FIG. 2 is a more detailed illustration of a computer system that may be used to implement any of the computer systems of FIG. 1 in accordance with the present invention. Data processing system 200 may be a symmetric multiprocessor (SMP) system including a plurality of SMT-capable processors 202 and 204 connected to system bus 206. Alternatively, a single processor system may be employed. In the depicted example, processor 204 is a service processor. All of the processors described herein with reference to all of the figures are SMT-capable processors. Each SMT-capable processor is capable of concurrently executing multiple threads on the one processor. Further, each thread will have assigned to it a hardware priority that the processor will use when determining what and how many resources to grant to a particular thread.

Also connected to system bus 206 is memory controller/cache 208, which provides an interface to local memory 209.

I/O bus bridge 210 is connected to system bus 206 and provides an interface to I/O bus 212. Memory controller/cache 208 and I/O bus bridge 210 may be integrated as depicted.

Peripheral component interconnect (PCI) bus bridge 214 connected to I/O bus 212 provides an interface to PCI local bus 216. A number of modems may be connected to PCI bus 216. Typical PCI bus implementations will support four PCI expansion slots or add-in connectors. Communications links to network computers 108-112 in FIG. 1 may be provided through modem 218 and network adapter 220 connected to PCI local bus 216 through add-in boards.

Network adapter 220 includes a physical layer 282 which conditions analog signals to go out to the network, such as for example an Ethernet network over an R45 connector. A media access controller (MAC) 280 is included within network adapter 220. Media access controller (MAC) 280 is coupled to bus 216 and processes digital network signals. MAC 280 serves as an interface between bus 216 and physical layer 282. MAC 280 performs a number of functions involved in the transmission and reception of data packets. For example, during the transmission of data, MAC 280 assembles the data to be transmitted into a packet with address and error detection fields. Conversely, during the reception of a packet, MAC 280 disassembles the packet and performs address checking and error detection. In addition, MAC 280 typically performs encoding/decoding of digital signals transmitted and performs preamble generation/removal as well as bit transmission/reception.

Additional PCI bus bridges 222 and 224 provide interfaces for additional PCI buses 226 and 228, from which additional modems or network adapters may be supported. In this manner, data processing system 200 allows connections to multiple network computers. A memory-mapped graphics adapter 230 and hard disk 232 may also be connected to I/O bus 212 as depicted, either directly or indirectly.

Service processor 204 interrogates system processors, memory components, and I/O bridges to generate an inventory and topology understanding of data processing system 200. Service processor 204 also executes Built-In-Self-Tests (BISTs), Basic Assurance Tests (BATs), and memory tests on all elements found by interrogating a system processor, memory controller, and I/O bridge. Any error information for failures detected during the BISTs, BATs, and memory tests are gathered and reported by service processor 204.

Those of ordinary skill in the art will appreciate that the hardware depicted in FIG. 2 may vary. For example, other peripheral devices, such as optical disk drives and the like, also may be used in addition to or in place of the hardware depicted. The depicted example is not meant to imply architectural limitations with respect to the present invention.

The present invention may be executed by one of the computers depicted by FIG. 1 or 2.

Figure 3:
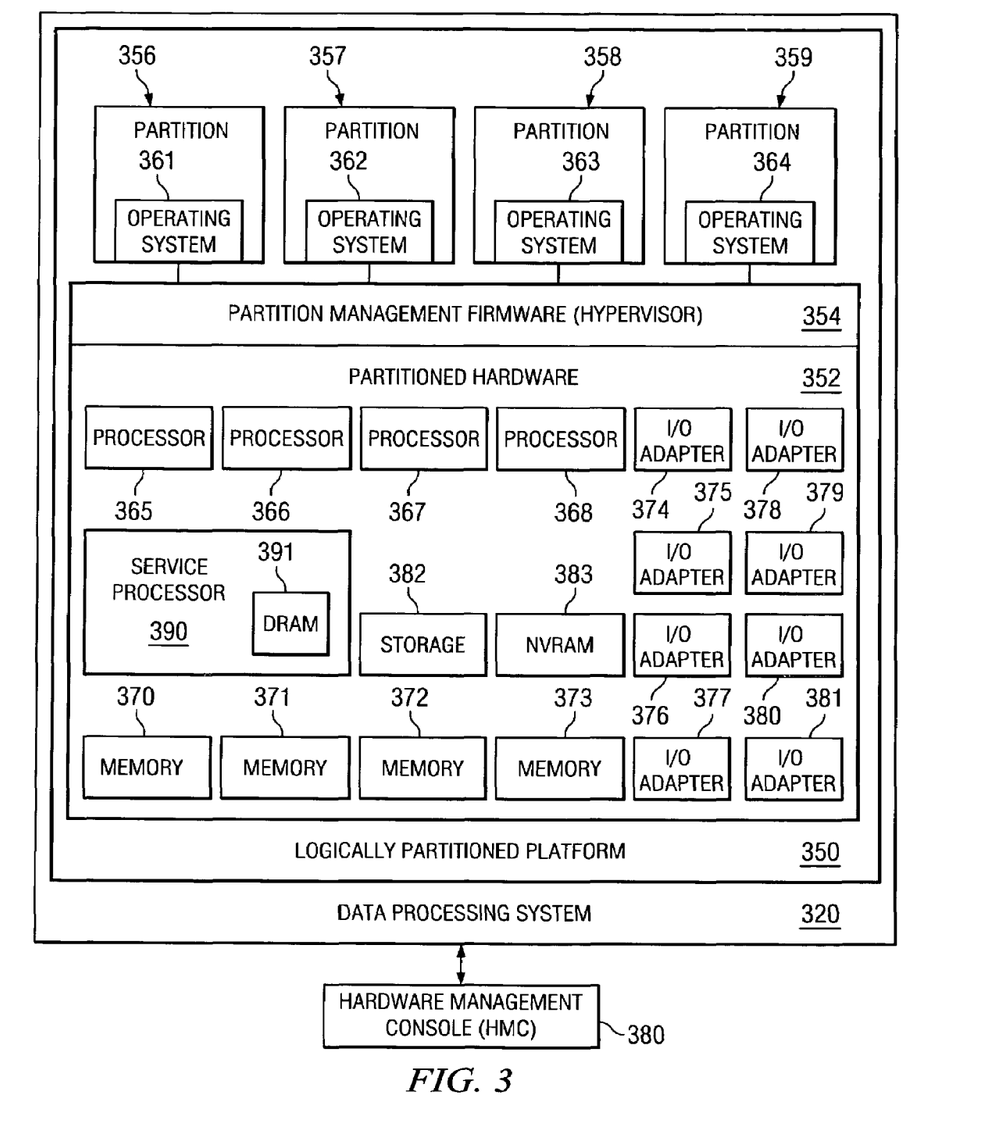
FIG. 3 is a block diagram of a hardware management console coupled to a data processing system, including a logically partitioned platform, that includes the present invention in accordance with the present invention.

FIG. 3 is a block diagram of a hardware management console that is coupled to a data processing system, including a logically partitioned platform, that includes the present invention. Data processing system 320 includes logically partitioned platform 350. Platform 350 includes partitioned hardware 352, partition management firmware, also called a hypervisor 354, and partitions 356-359. Operating systems 361-364 exist within partitions 356-359. Operating systems 361-364 may be multiple copies of a single operating system or multiple heterogeneous operating systems simultaneously run on platform 350.

Partitioned hardware 352 includes a plurality of SMT-capable processors 365-368, a plurality of system memory units 370-373, a plurality of input/output (I/O) adapters 374-381, and a storage unit 382. Each of the processors 365-368, memory units 370-373, NVRAM storage 383, and I/O adapters 374-381 may be assigned to one of multiple partitions 356-359. Partitioned hardware 352 also includes service processor 390. A non-volatile memory device 391, such as an NVRAM device, is included within service processor 390.

Partition management firmware (hypervisor) 354 performs a number of functions and services for partitions 356-359 to create and enforce the partitioning of logically partitioned platform 350. Hypervisor 354 is a firmware implemented virtual machine identical to the underlying hardware. Firmware is "software" stored in a memory chip that holds its content without electrical power, such as, for example, read-only memory (ROM), programmable ROM (PROM), erasable programmable ROM (EPROM), electrically erasable programmable ROM (EEPROM), and non-volatile random access memory (non-volatile RAM). Thus, hypervisor 354 allows the simultaneous execution of independent OS images 361-364 by virtualizing all the hardware resources of logically partitioned platform 250. Hypervisor 354 may attach I/O devices through I/O adapters 374-381 to single virtual machines in an exclusive mode for use by one of OS images 361-364.

A hardware management console (HMC) 380 may be coupled to service processor 390 in data processing system 320. HMC 380 is a separate computer system that is coupled to service processor 390 and may be used by a user to control various functions of system 320 through service processor 390. HMC 380 includes a graphical user interface (GUI) which may be used by a user to select a partition to be rebooted.

Figure 4:
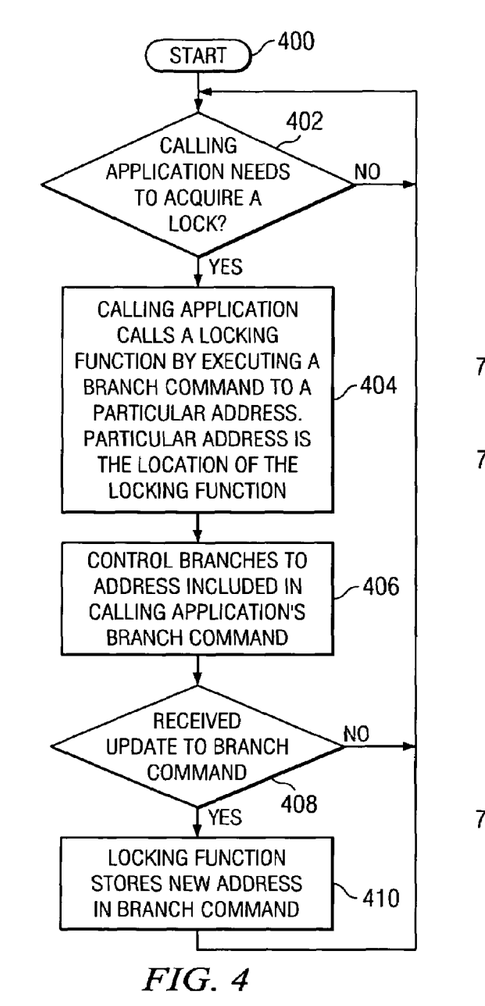
FIG. 4 depicts a high level flow chart that illustrates an application branching to a locking function to use to attempt to acquire a lock in accordance with the present invention.

FIG. 4 depicts a high level flow chart that illustrates an application branching to a locking function to attempt to acquire a lock in accordance with the present invention. The process starts as depicted by block 400 and thereafter passes to block 402 which illustrates a determination of whether or not a calling application needs to acquire a lock. If a determination is made that a calling application does not need to acquire a lock, the process passes back to block 402. Referring again to block 402, if a determination is made that a calling application does need to acquire a lock, the process passes to block 404 which depicts the calling application calling a locking function by executing a branch command to a particular address that is included in the branch command. The particular address is the location of a locking function to be used to attempt to acquire the lock.

Block 406, then, illustrates the software control branching to the address that is included in the calling application's branch command. The process then passes to block 408 which depicts a determination of whether or not the calling application has received an update to the branch command. If a determination is made that the calling application has not received an update to its branch command, the process passes back to block 402. Referring again to block 408, if a determination is made that the calling application has received an update to its branch command, the process passes to block 410 which illustrates a locking function storing a new address in the branch command. The next time the calling application executes this branch command, control will pass to a different address which is the new address that is now stored in the branch command. The process then passes back to block 402.

Figure 5:
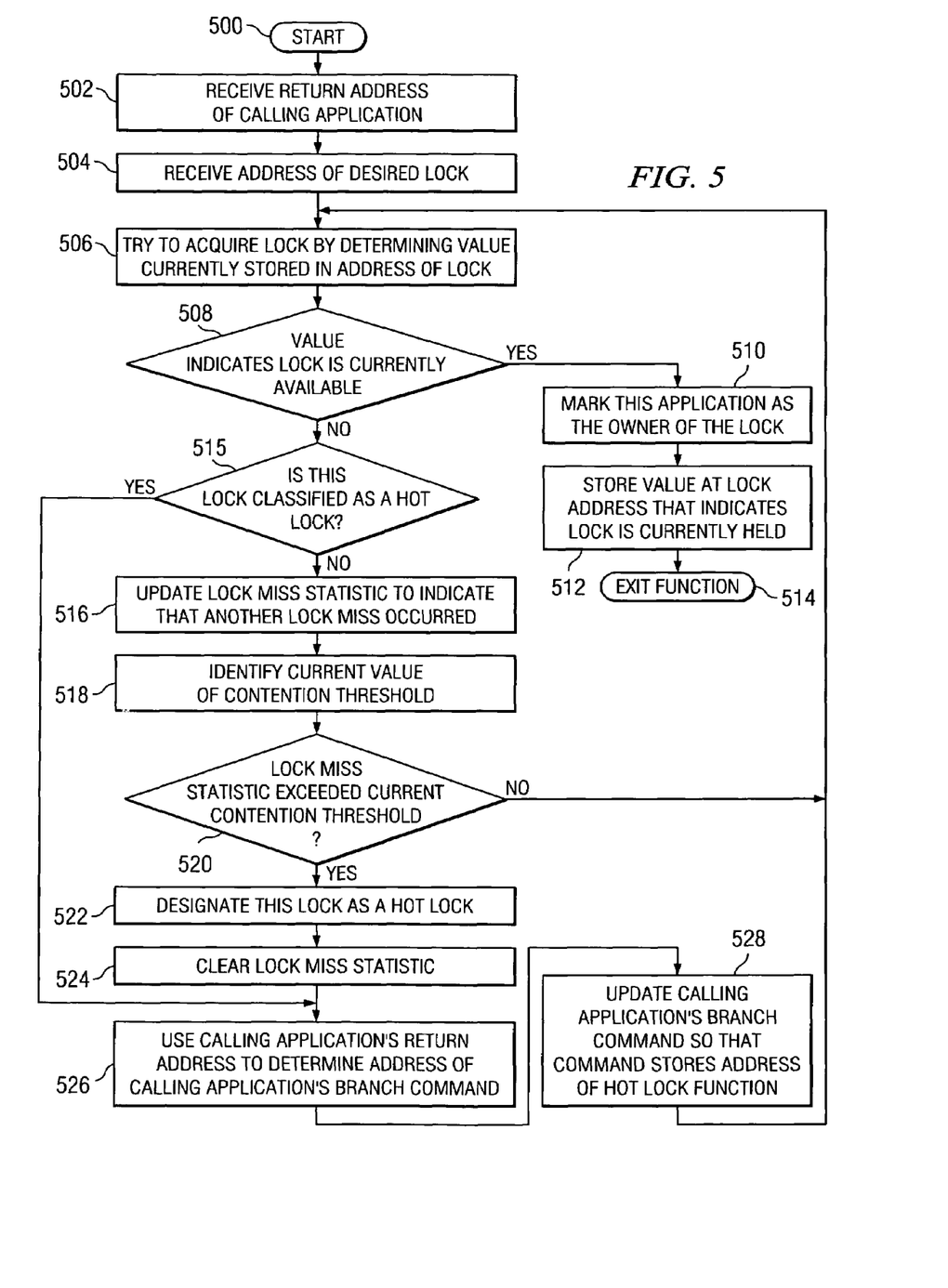
FIG. 5 illustrates a high level flow chart that depicts a modified locking function that includes the present invention in accordance with the present invention.

FIG. 5 illustrates a high level flow chart that depicts a modified locking function that includes the present invention in accordance with the present invention. The process starts as depicted by block 500 and thereafter passes to block 502 which illustrates the modified lock function receiving the return address of a calling application that just branched to this locking function. Next, block 504 depicts the locking function receiving the address of the desired lock from the calling application. Thereafter, block 506 illustrates the locking function trying to acquire the lock that is located at the address received from the calling application. The locking function attempts to acquire the lock by going to the lock address and determining what value is currently stored in the address. Next, block 508 depicts a determination of whether the value that is currently stored in the address indicates that the lock is currently available. If a determination is made that the value indicates that the lock is currently available, the process passes to block 510 which illustrates marking this application as the current owner of the lock. Block 512, then, depicts storing a value at the address of the lock that indicates that the lock is currently held and is not available. The process then exits the locking function as illustrated by block 514.

Referring again to block 508, if a determination is made that the value that is currently stored in the address indicates that the lock is not currently available, the process passes to block 515 which depicts a determination of whether or not this lock is classified, or designated, as a hot lock. If a determination is made that this lock is classified as a hot lock, the process passes to block 526. Referring again to block 515, if a determination is made that this lock is not classified as a hot lock, the process passes to block 516.

Block 516 depicts updating the current lock miss statistic to indicate that another lock miss has occurred. The process then passes to block 518 which illustrates identifying the current value of the contention threshold. Thereafter, block 520 depicts determining whether the lock miss value exceeds the current contention threshold. If a determination is made that the lock miss value does not exceed the current contention threshold, the process passes to block 506.

Referring again to block 520, if a determination is made that the lock miss value does exceed the current contention threshold, the process passes to block 522 which illustrates designating this lock as a hot lock. The address of a lock is actually an address of a structure in which a lock word and possibly other information may be stored. A lock may be designated as a hot lock by setting a bit in the lock word itself, or by storing data in the structure that includes the lock word to indicate that the lock is designated as being "hot".

Next, block 524 depicts clearing, or resetting, the lock miss statistic to zero. The process then passes to block 526 which illustrates using the calling application's return address to determine the address of the calling application's branch command. Next, block 528 depicts updating the calling application's branch command so that the command stores the address of the hot lock function instead of the modified lock function. Thus, the locking function updates the branch command by storing a new address in the branch command. The process then passes to block 506.

Figure 6:
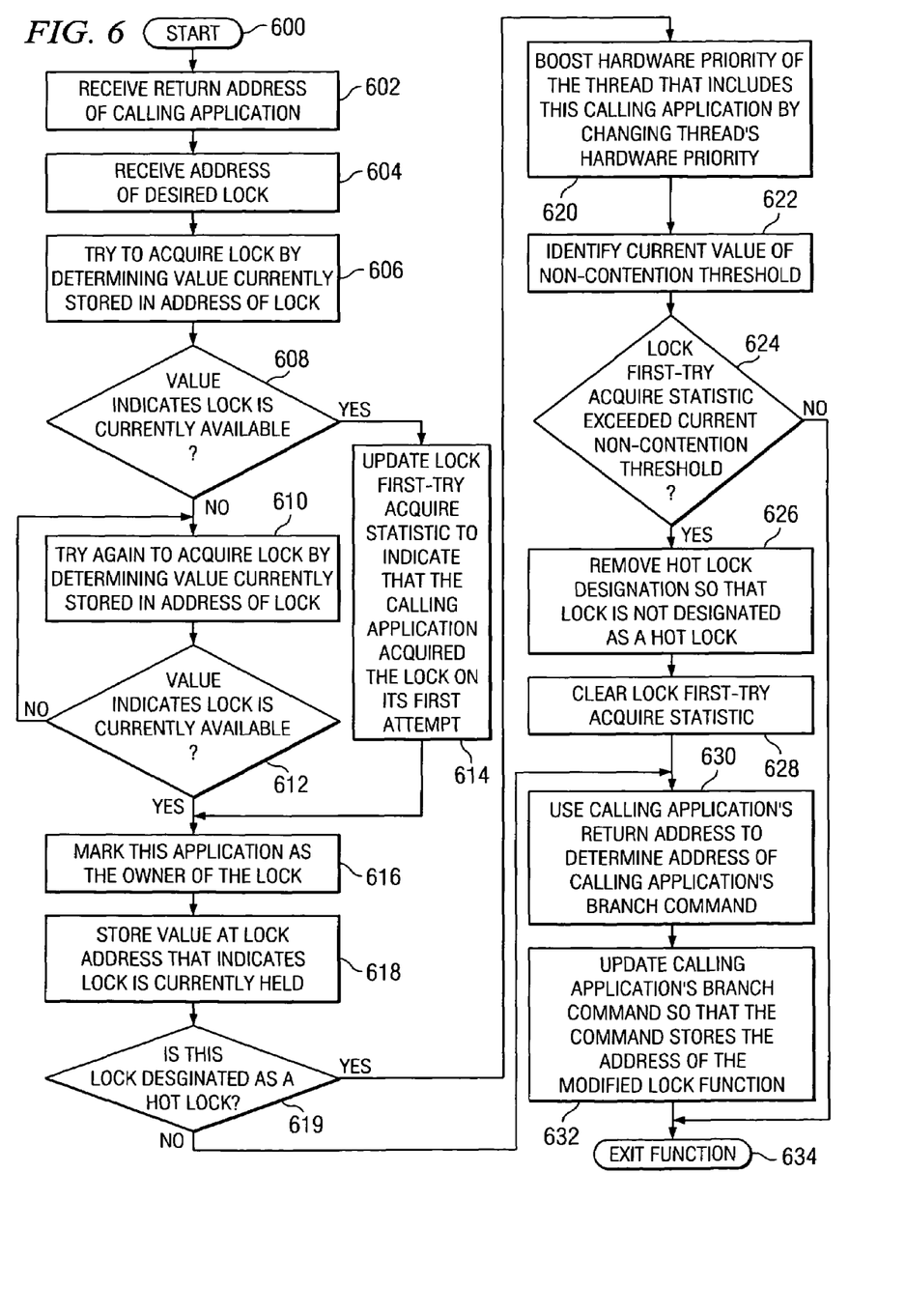
FIG. 6 depicts a high level flow chart that illustrates a hot-lock locking function that includes the present invention in accordance with the present invention.

FIG. 6 depicts a high level flow chart that illustrates a hot-lock locking function that includes the present invention in accordance with the present invention. The process starts as depicted by block 600 and thereafter passes to block 602 which illustrates receiving a return address of a calling application that just branched to this hot locking function. Next, block 604 depicts the locking function receiving the address of a lock from the calling application.

Thereafter, block 606 illustrates the hot locking function trying to acquire the lock that is located at the address received from the calling application. The hot locking function attempts to acquire the lock by going to the lock address and determining what value is currently stored in the address. Next, block 608 depicts a determination of whether the value that is currently stored in the address indicates that the lock is currently available. If a determination is made that the value indicates that the lock is not currently available, the process passes to block 610 which illustrates trying again to acquire the lock by determining the value that is currently stored in the address of the lock. Next, block 612 depicts a determination of whether or not the value indicates that the lock is currently available. If a determination is made that the lock is not currently available, the process passes back to block 610. Referring again to block 612, if a determination is made that the value indicates that the lock is currently available, the process passes to block 616.

Referring again to block 608, if a determination is made that the value indicates that the lock is currently available, the process passes to block 614 which depicts updating the lock first-try acquire statistic to indicate that the calling application acquired the lock on its first attempt. Next, block 616 illustrates marking this calling application as the owner of the lock. The process then passes to block 618 which depicts storing a value at the lock address that indicates that the lock is currently held.

Next, block 619 depicts a determination of whether or not this lock is designated as a hot lock. If a determination is made that this lock is not designated as a hot lock, the process passes to block 630. Referring again to block 619, if a determination is made that this lock is designated as a hot lock, the process passes to block 620.

Block 620 illustrates boosting the hardware priority of the thread that includes this calling application. Each thread has an associated hardware register. The thread's priority is stored in that thread's hardware register. A thread's hardware priority is boosted by storing a value that indicates a higher priority in the register that is associated with that thread. A processor can compare the priority of each running thread by looking in the register associated with each thread to determine the priority of that thread.

The process then passes to block 622 which depicts determining the current non-contention threshold. Next, block 624 illustrates a determination of whether or not the lock first-try acquire statistic exceeds the current non-contention threshold. If a determination is made that the first-try acquire statistic does not exceed the current non-contention threshold, the process exits the hot lock function as depicted by block 634.

Referring again to block 624, if a determination is made that the lock first-try statistic does exceed the non-contention threshold, the process passes to block 626 which illustrates removing the hot lock designation from this lock so that the lock is now not designated as a hot lock. Next, block 628 depicts clearing, or resetting, the lock first-try acquire statistic to zero. Thereafter, block 630 illustrates using the calling application's return address to determine the address of the calling application's branch command. Next, block 632 depicts updating the calling application's branch command so that the command now stores the address of the modified lock function. The process then exits the hot lock function as illustrated by block 634.

Figure 7:
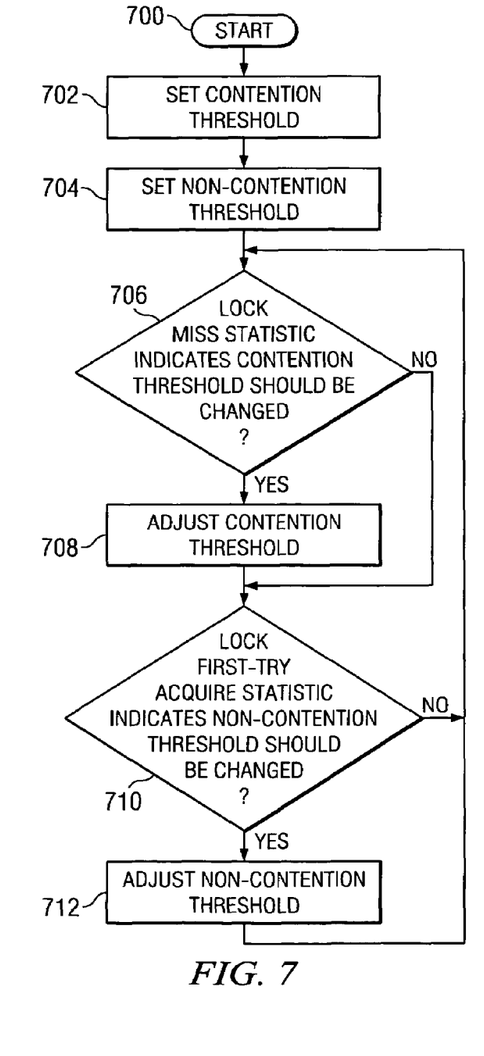
FIG. 7 illustrates a high level flow chart that depicts dynamically adjusting, during runtime, thresholds that are used to determine whether to a lock is a hot lock in accordance with the present invention.

FIG. 7 illustrates a high level flow chart that depicts dynamically adjusting thresholds during runtime that are used to determine whether to a lock is a hot lock in accordance with the present invention. The process starts as depicted by block 700 and thereafter passes to block 702 which illustrates setting a contention threshold. Next, block 704 depicts setting a non-contention threshold. Block 706, then, illustrates a determination of whether or not the lock miss statistic indicates that the contention threshold should be changed. If a determination is made that the lock miss statistic indicates that the contention threshold should be changed, the process passes to block 708 which depicts adjusting the contention threshold. The contention threshold value is now the adjusted value. Referring again to block 706, if a determination is made that the lock miss statistic does not indicate that the contention threshold should be changed, the process passes to block 710.

Block 710 illustrates a determination of whether or not the lock first-try acquire statistic indicates that the non-contention threshold should be changed. If a determination is made that the lock first-try acquire statistic indicates that the non-contention threshold should not be changed, the process passes back to block 706. Referring again to block 710, if a determination is made that the lock first-try acquire statistic indicates that the non-contention threshold should be changed, the process passes to block 712 which depicts adjusting the non-contention threshold. The non-contention threshold value is now the adjusted value. The process then passes back to block 706.

It is important to note that while the present invention has been described in the context of a fully functioning data processing system. Those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media, such as a floppy disk, a hard disk drive, a RAM, CD-ROMs, DVD-ROMs, and transmission-type media, such as digital and analog communications links, wired or wireless communications links using transmission forms, such as, for example, radio frequency and light wave transmissions. The computer readable media may take the form of coded formats that are decoded for actual use in a particular data processing system.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method in a simultaneous multithreading data processing system for modifying the processing of multiple software threads that acquire a software lock, said method comprising:
    concurrently executing multiple software threads on a processor included in said data processing system;
    assigning a hardware priority to each one of said multiple software threads;
    identifying the software lock as a contentious lock by a first locking function;
    boosting, by the first locking function, a hardware priority of each of said multiple software threads that successfully acquires said contentious lock;
    identifying a command that was executed by one of the multiple software threads to branch to a second locking function;
    tracking, by said second locking function, a number of times said one of the multiple software threads successfully acquires a lock on said first attempt to acquire said lock;
    comparing, by said second locking function, said number of times to a non-contention threshold;
    in response to said number of times exceeding said non-contention threshold, identifying said lock as a non-contentious lock;
    in response to identifying said lock as the non-contentious lock, storing an address of said first locking function in said command; and
    in response to a next execution of said command, branching to said first locking function instead of branching to said second locking function and continue executing the multiple software threads.

2. The method according to claim 1, further comprising:
    tracking, by said first locking function, a number of times one of said threads attempts unsuccessfully to acquire a lock;
    comparing, by said first locking function, said number of times to a contention threshold; and
    in response to said number of times exceeding said contention threshold, identifying said lock as a contentious lock.

3. The method according to claim 2, further comprising:
    identifying a command that was executed by said thread to branch to said first locking function;
    in response to identifying said lock as a contentious lock, storing an address of a second locking function in said command; and
    in response to a next execution of said command, branching to said second locking function instead of branching to said first locking function.

4. The method according to claim 1, further comprising:
    dynamically adjusting said contention threshold during runtime of said system; and
    dynamically adjusting said non-contention threshold during runtime of said system.

5. An apparatus in a simultaneous multithreading data processing system for modifying the processing of multiple software threads that acquire a software lock, said apparatus comprising:
    a processor concurrently executing multiple software threads;
    a hardware priority assigned to each one of said multiple software threads;
    a first locking function for identifying the software lock as a contentious lock;
    said first locking function boosting a hardware priority of each of said multiple software threads that successfully acquires said contentious lock;
    a second locking function for identifying a command that was executed by one of the multiple software threads to branch to a second locking function;
    said second locking function tracking a number of times said one of the multiple software threads successfully acquires a lock on said first attempt to acquire said lock;
    said second locking function comparing said number of times to a non-contention threshold;
    in response to said number of times exceeding said non-contention threshold, said second locking function identifying said lock as a non-contentious lock;
    in response to identifying said lock as a non-contentious lock, said second locking function storing an address of said first locking function in said command; and
    in response to a next execution of said command, said processor branching to said first locking function instead of branching to said second locking function.

6. The apparatus according to claim 5, further comprising:
    said first locking function tracking a number of times one of said threads attempts unsuccessfully to acquire a lock;

said first locking function comparing said number of times to a contention threshold; and in response to said number of times exceeding said contention threshold, said first locking function identifying said lock as a contentious lock.

7. The apparatus according to claim 6, further comprising:
said first locking function identifying a command that was executed by said thread to branch to said first locking function;

in response to identifying said lock as a contentious lock, said first locking function storing an address of a second locking function in said command; and in response to a next execution of said command, said processor branching to said second locking function instead of branching to said first locking function.

8. The apparatus according to claim 5, further comprising:
said contention threshold being dynamically adjusted during runtime of said system; and said non-contention threshold being dynamically adjusted during runtime of said system.

9. A computer program product stored in a recordable-type media of simultaneous multithreading data processing system for modifying the processing of multiple software threads that acquire a software lock, said computer program product comprising:

instructions for concurrently executing multiple software threads on a processor included in said data processing system;

instructions for assigning a hardware priority to each one of said multiple software threads;

instructions for identifying the software lock as a contentious lock by a first locking function;

instructions for boosting, by the first locking function, a hardware priority of each of said multiple software threads that successfully acquires said contentious lock;

instructions for identifying a command that was executed by one of the multiple software threads to branch to a second locking function;

instructions for tracking, by said second locking function, a number of times said one of the multiple software threads successfully acquires a lock on said first attempt to acquire said lock;

instructions for comparing, by said second locking function, said number of times to a non-contention threshold;

in response to said number of times exceeding said non-contention threshold, instructions for identifying said lock as a non-contentious lock;

in response to identifying said lock as a non-contentious lock, instructions for storing an address of said first locking function in said command; and in response to a next execution of said command, instructions for branching to said first locking function instead of branching to said second locking function.

10. The product according to claim 1, further comprising:
instructions for tracking, by said first locking function, a number of times one of said threads attempts unsuccessfully to acquire a lock;

instructions for comparing, by said first locking function, said number of times to a contention threshold; and in response to said number of times exceeding said contention threshold, instructions for identifying said lock as a contentious lock.

11. The product according to claim 10, further comprising:
instructions for identifying a command that was executed by said thread to branch to said first locking function;

in response to identifying said lock as a contentious lock, instructions for storing an address of a second locking function in said command; and in response to a next execution of said command, instructions for branching to said second locking function instead of branching to said first locking function.

12. The product according to claim 9, further comprising:
instructions for dynamically adjusting said contention threshold during runtime of said system; and instructions for dynamically adjusting said non-contention threshold during runtime of said system.

* * * * *